(12) United States Patent
Kambayashi et al.

(10) Patent No.: US 8,920,966 B2
(45) Date of Patent: Dec. 30, 2014

(54) BATTERY

(75) Inventors: Hirokazu Kambayashi, Kyoto (JP); Shogo Tsuruta, Kyoto (JP); Isao Suzuki, Kyoto (JP)

(73) Assignee: GS Yuasa International Ltd., Kyoto-Shi, Kyoto (JP)

( * ) Notice: Subject to any disclaimer, the term of this patent is extended or adjusted under 35 U.S.C. 154(b) by 53 days.

(21) Appl. No.: 13/361,878

(22) Filed: Jan. 30, 2012

(65) Prior Publication Data

US 2012/0196178 A1    Aug. 2, 2012

(30) Foreign Application Priority Data

Jan. 31, 2011  (JP) .................................. 2011-18545

(51) Int. Cl.
| | |
|---|---|
| *H01M 2/30* | (2006.01) |
| *H01M 10/05* | (2010.01) |
| *H01M 2/04* | (2006.01) |
| *H01M 2/08* | (2006.01) |
| *H01M 2/22* | (2006.01) |
| *H01M 10/058* | (2010.01) |

(52) U.S. Cl.
CPC ............ *H01M 10/05* (2013.01); *H01M 2/0456* (2013.01); *H01M 2/08* (2013.01); *H01M 2/22* (2013.01); *H01M 2/30* (2013.01); *H01M 10/058* (2013.01)
USPC ....................................................... 429/178

(58) Field of Classification Search
USPC ................................................ 429/178, 179
See application file for complete search history.

(56) References Cited

U.S. PATENT DOCUMENTS

| | | | |
|---|---|---|---|
| 4,770,958 | A | 9/1988 | Newman et al. |
| 6,051,332 | A | 4/2000 | Verhoog et al. |
| 6,190,798 | B1 | 2/2001 | Okada et al. |
| 6,444,348 | B1 | 9/2002 | Saijo et al. |
| 6,465,122 | B1 | 10/2002 | Kitaoka et al. |
| 6,534,212 | B1 * | 3/2003 | Hooke ............................ 429/94 |
| 2003/0049521 | A1 | 3/2003 | Iwase et al. |
| 2006/0093907 | A1 | 5/2006 | Jeon et al. |
| 2011/0045325 | A1 | 2/2011 | Anzai et al. |

(Continued)

FOREIGN PATENT DOCUMENTS

| | | |
|---|---|---|
| DE | 102007063191 A1 | 6/2009 |
| EP | 0875949 A1 | 11/1998 |

(Continued)

OTHER PUBLICATIONS

European Search Report with English Translation dated Jun. 5, 2012.

(Continued)

*Primary Examiner* — Mark F Huff
*Assistant Examiner* — Olatunji Godo
(74) *Attorney, Agent, or Firm* — McGinn IP Law Group, PLLC

(57) ABSTRACT

A battery includes a cover for sealing an opening of a battery case which contains an electrode assembly therein and current collectors for electrically connecting external terminals whose at least parts are disposed outside of the cover to the electrode assembly, respectively. Gaskets are interposed between a lower surface of the cover and the current collectors, respectively. In the gasket, a caulked portion is contained in an engagement recess formed at the lower surface of the cover. In contrast, the entire gasket is contained in another engagement recess formed at the lower surface.

12 Claims, 7 Drawing Sheets

(56) References Cited

U.S. PATENT DOCUMENTS

| | | |
|---|---|---|
| 2011/0076553 A1 | 3/2011 | Kameda et al. |
| 2012/0196178 A1 | 8/2012 | Kambayashi et al. |
| 2012/0196179 A1* | 8/2012 | Suzuki et al. ............ 429/179 |

FOREIGN PATENT DOCUMENTS

| | | | |
|---|---|---|---|
| EP | 1079449 A1 | 2/2001 |
| JP | 1-52377 A | 2/1989 |
| JP | 2003-346882 A | 12/2003 |
| JP | 2004-071199 A | 3/2004 |
| JP | 2006-093134 A | 4/2006 |
| JP | 2006-216411 A | 8/2006 |
| JP | 2009-277603 A | 11/2009 |
| JP | 2010-097764 A | 4/2010 |
| WO | WO 2009/130740 A1 | 10/2009 |

OTHER PUBLICATIONS

European Search Report dated Jun. 6, 2012, with English-language Translation Thereof.
United States Office Action dated Jul. 2, 2013, in U.S. Appl. No. 13/361,883.
United States Office Action dated Mar. 5, 2014 in U.S. Appl. No. 13/361,883.
Japanese Office Action dated May 27, 2014.

* cited by examiner

BATTERY

BACKGROUND OF THE INVENTION

1. Field of the Invention

The present invention relates to a battery including a nonaqueous electrolytic secondary battery.

2. Description of the Related Art

A battery such as a nonaqueous electrolytic secondary battery includes a positive current collector and a negative current collector for electrically connecting a positive electrode and a negative electrode in an electrode assembly contained inside of a battery case to a positive external terminal and a negative external terminal, respectively. A base of the current collector is fixed to a cover for sealing an upper opening of the battery case by means such as caulking using, for example, a rivet. A lower gasket for securing sealability or the like is interposed between the base of the current collector and a lower surface of the cover (see Japanese Unexamined Patent Application Publication No. 2003-346882 (FIG. 1)).

The higher the occupancy of an electrode assembly with respect to the volume of a battery case, the higher the energy density. Consequently, from the viewpoint of energy efficiency, it is preferable that the upper end of the electrode assembly should be disposed as proximately to the lower surface of a cover as possible. However, when the lower gasket formed into a substantially merely flat plate disclosed in Japanese Unexamined Patent Application Publication No. 2003-346882 is disposed at the lower surface of the cover, the upper end of the electrode assembly cannot be disposed sufficiently proximately to the lower surface of the cover, and therefore, a high energy density cannot be achieved. Moreover, the flat cover and the flat lower gasket are brought into mere contact with each other on the plane, and therefore, the gasket is liable to be rotated. The rotation of the gasket exerts a load on a portion where an external terminal and a current collector are electrically connected to each other (e.g., a portion caulked and joined by a rivet).

SUMMARY OF THE INVENTION

An object of the present invention is to enhance the occupancy of an electrode assembly with respect to the volume of a battery case so as to improve energy density.

The present invention provides a battery including: a package containing an electrode assembly therein; a current collector which electrically connects an external terminal whose at least part is disposed outside of the package to the electrode assembly; and a gasket interposed between the inner surface of the package and the current collector, the gasket including a contained portion which is contained in a recess formed at the inner surface of the package.

The contained portion of the gasket interposed between the current collector and the package is contained in the recess formed at the inner surface of the package. Consequently, the projection of the gasket from the inner surface of the package can be suppressed to the minimum. The suppression of the projection of the gasket enables the end of the electrode assembly to be disposed sufficiently in the proximity of the inner surface of the package. Thus, energy density can be enhanced by increasing the occupancy of the electrode assembly with respect to the volume of the battery case.

Moreover, the wall surface defining the recess of the package is formed into not a flat shape but a recessed shape. The recessed wall surface restricts or restrains the position of the contained portion of the gasket which is contained in the recess. In other words, the recess of the package and the contained portion of the gasket are not brought into contact with each other on the plane. Consequently, the gasket can be prevented from being rotated with respect to the package. Therefore, a load can be prevented from exerting on a part of the gasket (e.g., a caulked and joined portion via a rivet) which may be caused by such rotation of the gasket.

The current collector preferably includes a base which is electrically connected to the external terminal and a connector which projects from the base and is electrically connected to the electrode assembly; and the contained portion of the gasket should preferably include a caulked portion which is caulked and joined to the package together with the base, the thickness of the caulked portion being greater than those of other portions of the gasket.

With the configuration, the weight of the gasket and a material required for fabricating the gasket can be reduced while enhancing air-tightness of the gasket.

A clearance is preferably defined between the surroundings of the contained portion of the gasket and the wall surface of the recess of the package.

With the configuration, a clearance for deformation (relief) in a planar direction with respect to compression in a thickness direction of a caulked portion can be secured at the time of caulking and joining, so that a damage such as a crack of the gasket can be securely prevented at the time of caulking and joining.

The gasket preferably includes a rib which is disposed at least at a portion corresponding to a position at the outer peripheral edge of the body where the connector projects from the base of the current collector and has a height more than a thickness of the base of the current collector.

With the configuration, the rib satisfactorily ensures an insulation distance between the current collector and the package, thus securely insulating the current collector from the package.

In this case, as the fixed portion of the base is inside of the recess of the package, the projection of the current collector from the surface of the inner surface of the package can be further suppressed to the minimum. The suppression of the projection of the current collector enables the end of the electrode assembly to be disposed further sufficiently in the proximity of the inner surface of the package. Thus, energy density can be further enhanced by increasing the occupancy of the electrode assembly with respect to the volume of the battery case.

DETAILED DESCRIPTION OF THE PREFERRED EMBODIMENT

A detailed description will be given below of an embodiment according to the present invention with reference to the attached drawings.

Figure 1:
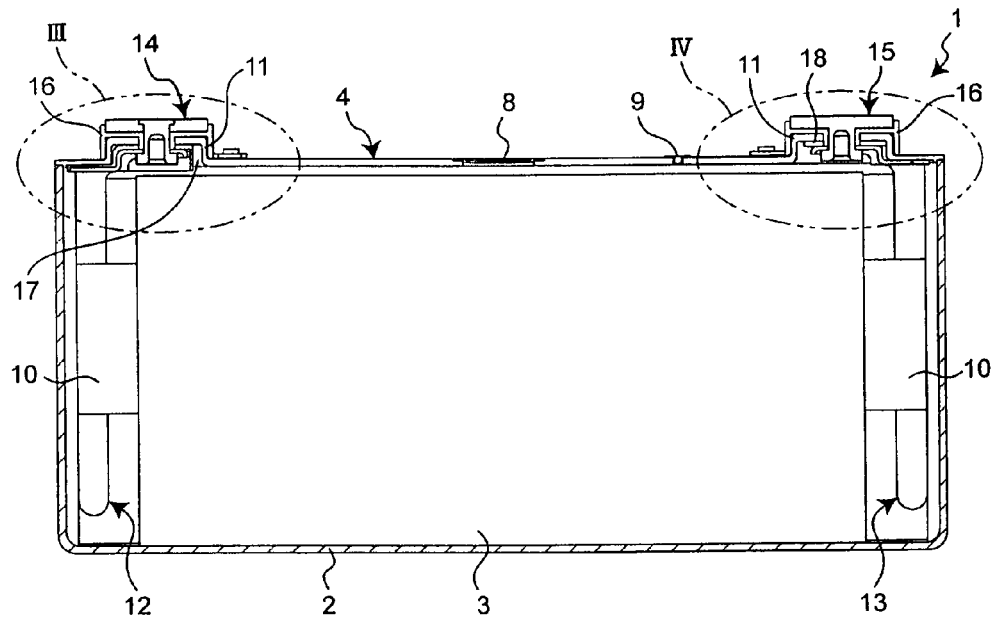
FIG. 1 is a vertical cross-sectional view of a battery in an embodiment according to the present invention.

FIG. 1 shows a nonaqueous electrolytic secondary battery 1 (hereinafter simply referred to as a battery) in an embodiment according to the present invention. An electrode assembly 3 of the battery 1 is housed in a battery case 2 which is made of aluminum or an aluminum alloy and is formed into a rectangular parallelepiped shape. An upper opening of the battery case 2 is sealed by a cover 4. The battery case 2 and the cover 4 constitute a package. The upper surfaces of a negative external terminal 14 and a positive external terminal 15 are exposed to the outside of the cover 4.

The electrode assembly 3 includes a negative electrode formed of a copper foil, a positive electrode formed of an aluminum foil, and a separator 7 formed of a porous resin film and interposed in a wound manner between the negative electrode and the positive electrode. In the electrode assembly 3, the negative electrode is electrically connected to the negative external terminal 14 via a negative current collector 12 whereas the positive electrode is electrically connected to the positive external terminal 15 via a positive current collector 13.

Figure 2:
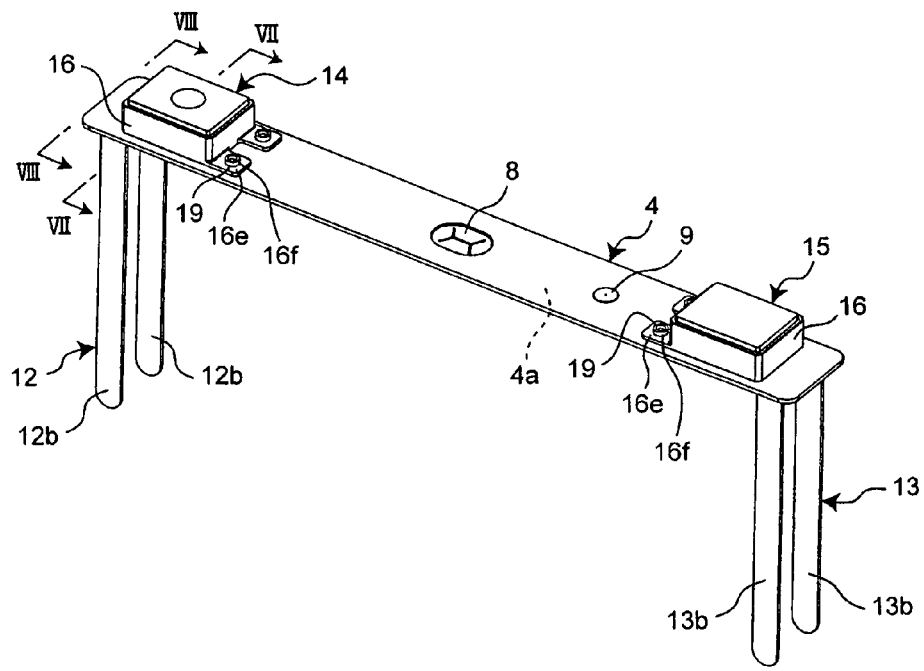
FIG. 2 is a perspective view of a cover.

As shown in FIG. 2, the cover 4 is made of an elongated metallic plate formed into a rectangular shape, as viewed on plane. The cover 4 includes a safe valve 8 near the center thereof in a longitudinal direction and a liquid injection hole 9 formed at one end thereof.

An engagement receiving portion 11 formed into a substantially rectangular shape, as viewed on plane, is formed at both ends of the cover 4 so as to expand upward from an upper surface 4b. The engagement receiving portion 11 has an engagement recess 11a formed by depressing a lower surface 4a of the cover 4. Moreover, a through hole 11b is formed at the center of a ceiling constituting the engagement recess 11a.

As shown in FIGS. 3 and 5 to 8, the negative external terminal 14 and the negative current collector 12 are fitted to the engagement receiving portion 11 on the left via an upper gasket 16 and a negative lower gasket 17 which are made of an insulating resin, respectively.

Referring to FIGS. 2 to 4, 6, and 7, explanation will be made on the upper gasket 16. The upper gasket 16 is a resin part having a terminal holding recess 16b on the upper side and a mounting recess 16c on the lower side which are partitioned by a partition wall 16a. A cylindrical portion 16d extending downward and having openings at both ends thereof is formed at the center of the partition wall 16a. The upper gasket 16 is put on the engagement receiving portion 11 from above, and then, attached to the cover 4 by containing the engagement receiving portion 11 in the mounting recess 16c. The cylindrical portion 16d is inserted into the through hole 11b to intrude into the engagement recess 11a. Moreover, engagement projections 19 projecting from the upper surface 4b of the cover 4 are inserted into engagement holes 16f formed at two tongue pieces 16e provided in the upper gasket 16.

Referring to FIGS. 3 and 5 to 10, explanation will be made on the negative lower gasket 17. The negative lower gasket 17 includes an expanded portion 17a which is to be contained inside of the engagement recess 11a of the cover 4, and a flat portion 17b which is disposed in a region adjacent to the engagement recess 11a at the lower surface 4a of the cover 4 and is formed into a substantially rectangular shape.

Figure 9:
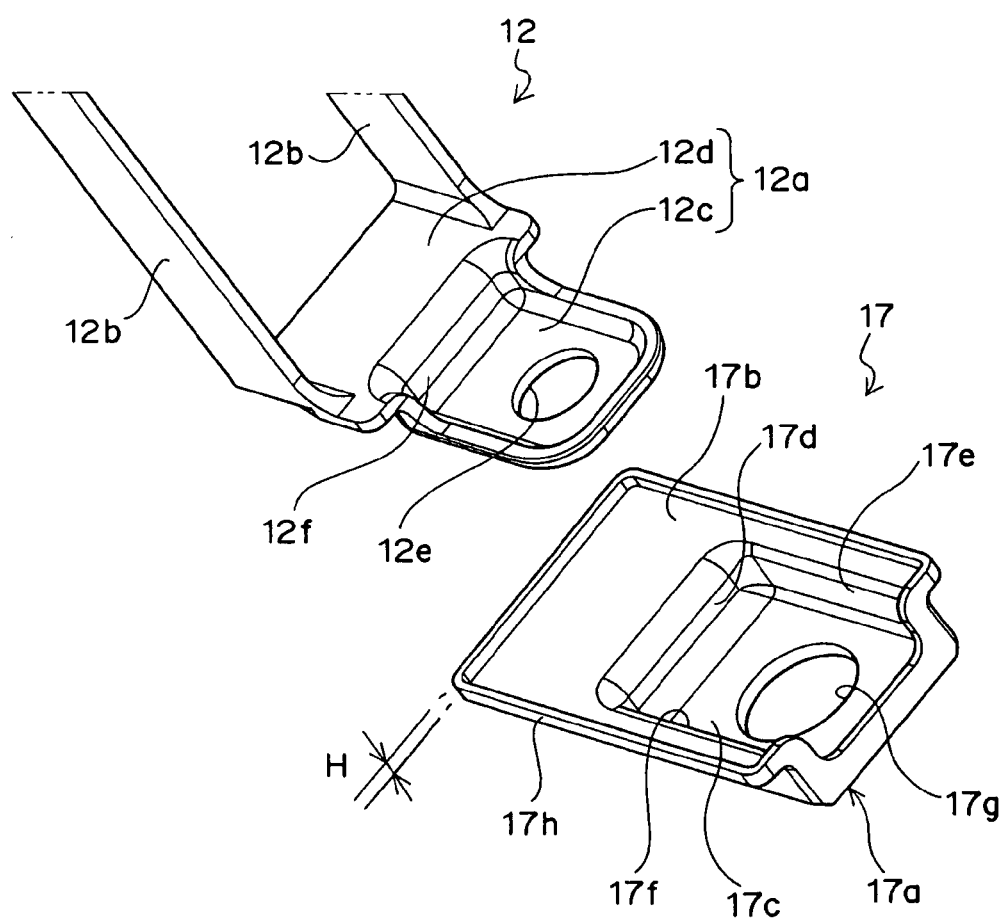
FIG. 9 is an exploded perspective view of the lower gasket and a negative current collector, as viewed from the bottom.
Figure 10:
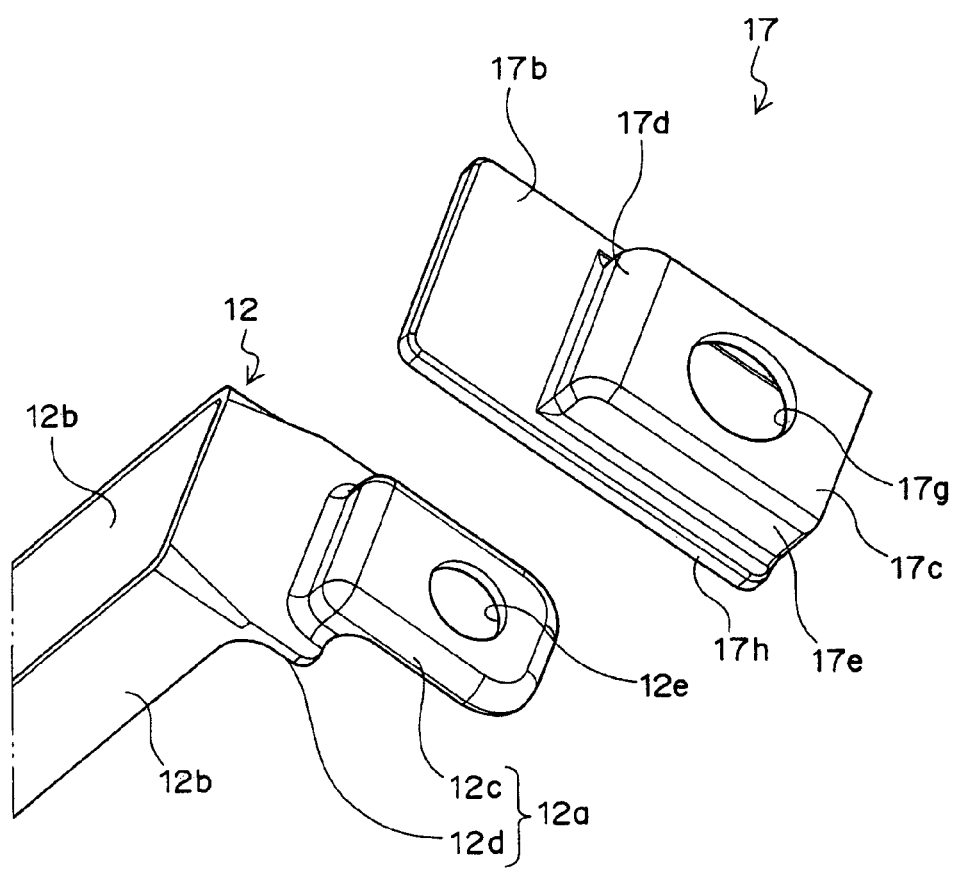
FIG. 10 is an exploded perspective view of the lower gasket and the negative current collector, as viewed from the top.

As most clearly shown in FIGS. 9 and 10, the expanded portion 17a of the negative lower gasket 17 includes a caulked portion 17c which is disposed with a step in a height direction with respect to the flat portion 17b and extends in parallel to the flat portion 17b.

Figure 3:
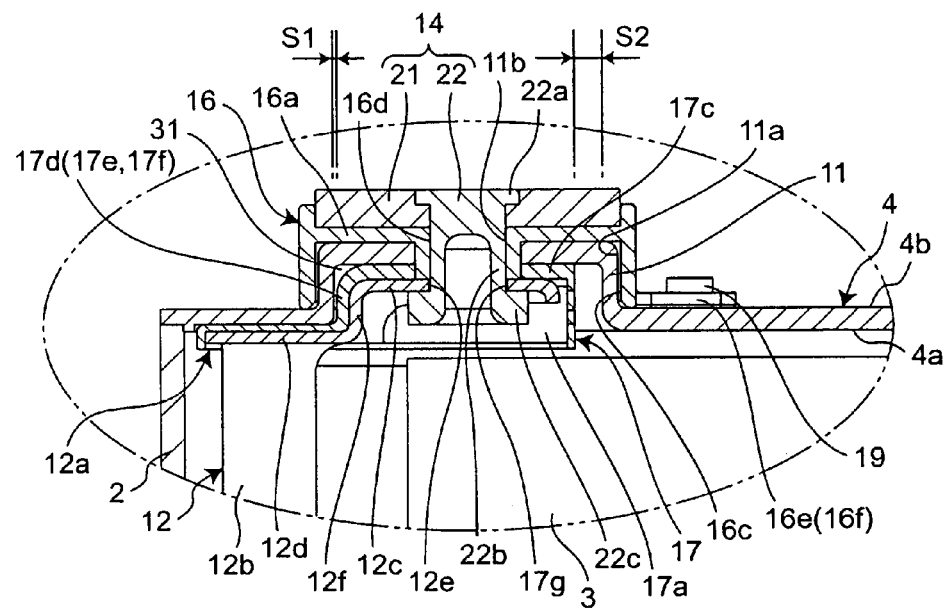
FIG. 3 is an enlarged view of a section III of FIG. 1.
Figure 4:
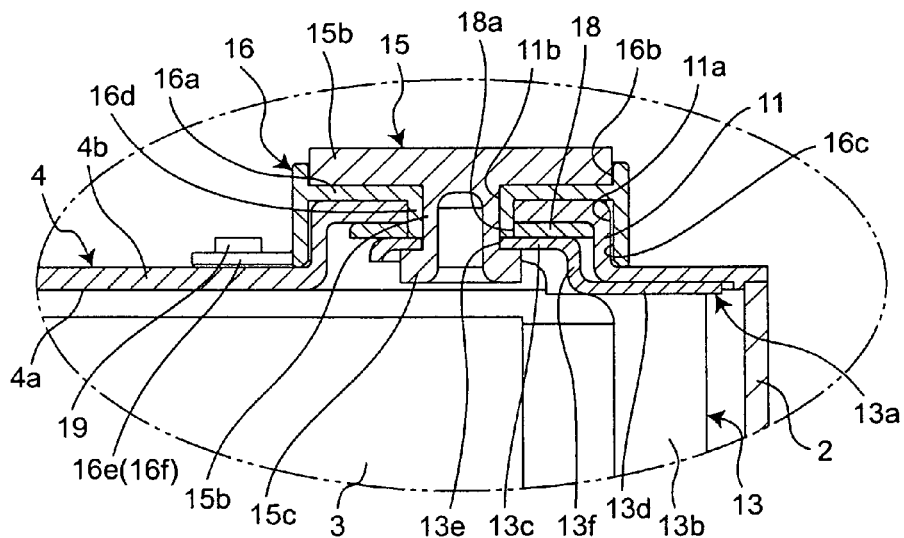
FIG. 4 is an enlarged view of a section IV of FIG. 1.
Figure 5:
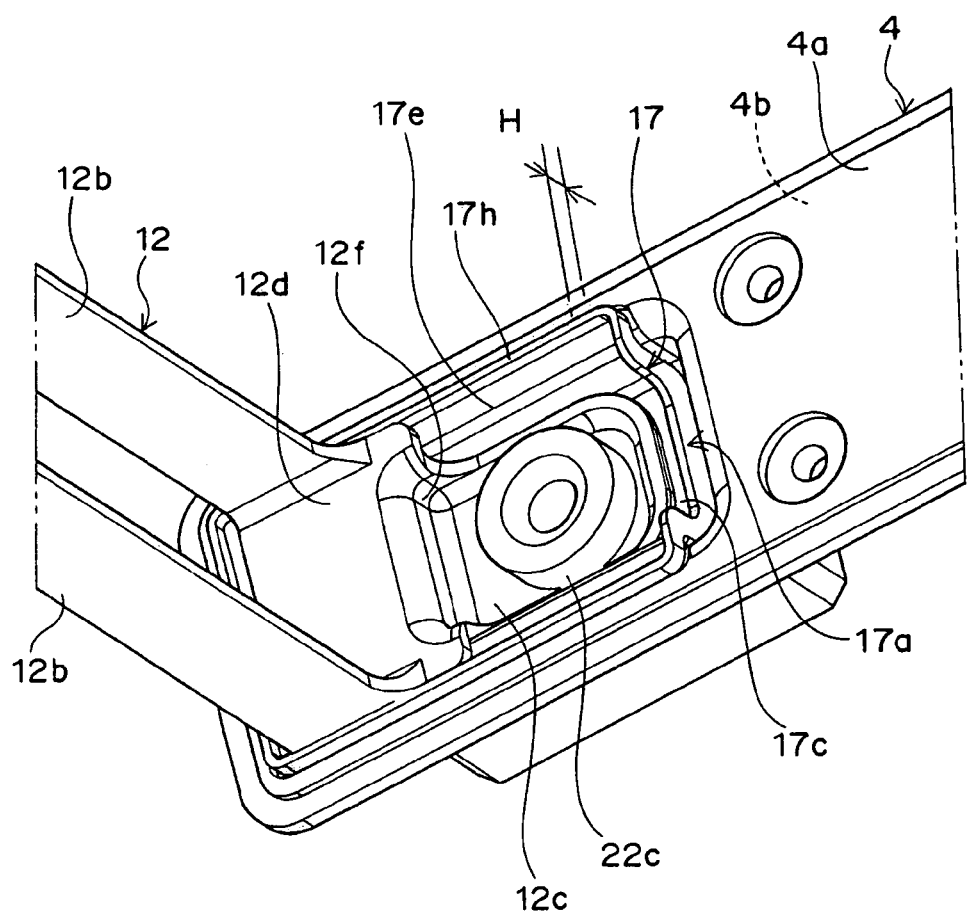
FIG. 5 is a perspective view of the surroundings of a lower gasket on the side of a lower surface of the cover.
Figure 6:
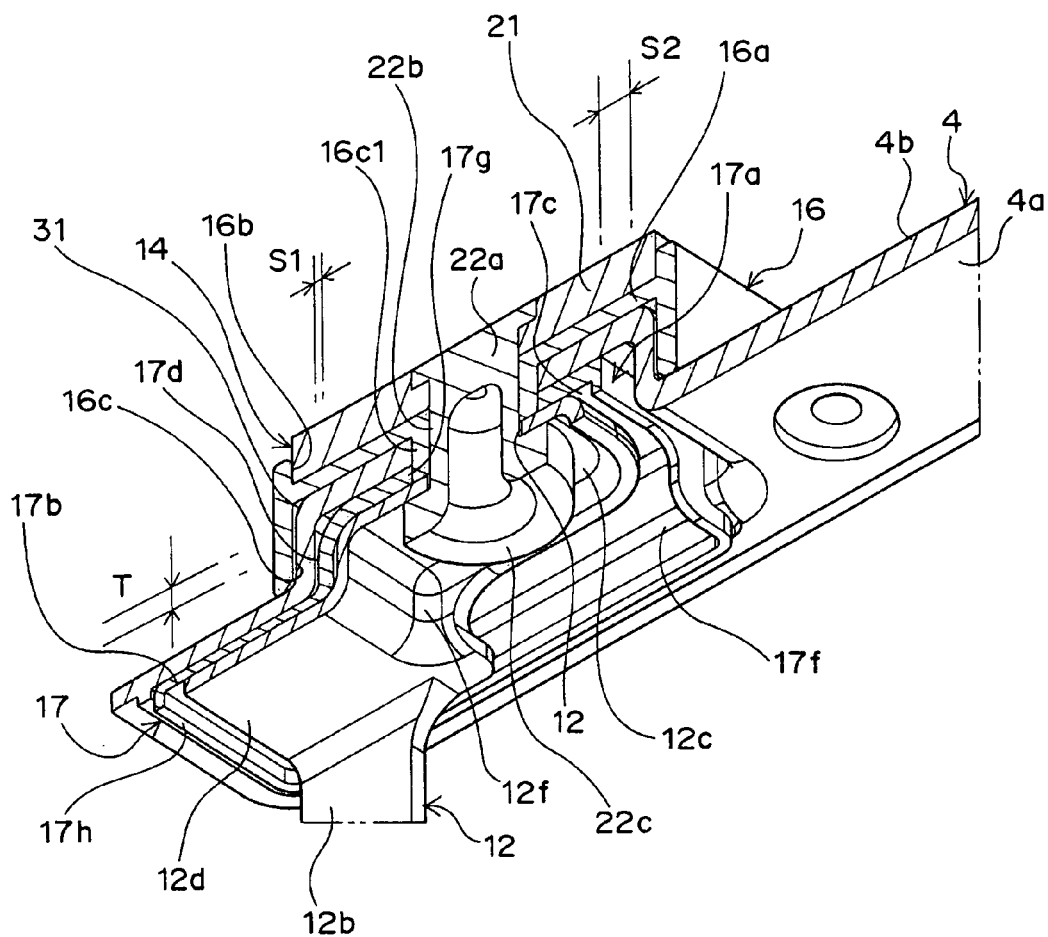
FIG. 6 is a partly cross-sectional perspective view of the surroundings of the lower gasket on the side of the lower surface of the cover.

The caulked portion 17c in the negative lower gasket 17 is disposed on one short side of the flat portion 17b, and further, is connected via three vertical walls 17d, 17e, and 17f to the flat portion 17b. A through hole 17g penetrating in a thickness direction is formed in the caulked portion 17c. As shown in FIGS. 3 and 6, the cylindrical portion 16d of the upper gasket 16 is inserted into the through hole 17g around the lower end thereof.

As most clearly shown in FIG. 9, a rib 17h projecting downward is disposed at the outer peripheral edge of the flat portion 17b of the negative lower gasket 17 except a part of one short side (a short side forward in FIG. 9).

Referring to FIGS. 3 and 5 to 7, a description will be given of the negative external terminal 14. The negative external terminal 14 includes an aluminum plate-like member 21 having a rectangular shape, as viewed on plane, and a copper rivet 22. A flange 22a is press-fitted into a through hole 21a formed at the center of the plate-like member 21 so that the rivet 22 is fixed to the plate-like member 21 in the state in which a shaft 22b projects. The plate-like member 21 is contained in the terminal holding recess 16b of the upper gasket 16.

Referring to FIGS. 3 and 5 to 10, explanation will be made on the negative current collector 12. The copper negative current collector 12 includes a base 12a and a pair of legs (connectors) 12b and 12b. The base 12a includes a fixed portion 12c, which is contained inside of the engagement recess 11a formed at the lower surface 4a of the cover 4 and is fitted to the lower side of the caulked portion 17c in the expanded portion 17a of the negative lower gasket 17, and a mount 12d to be fitted onto the lower side of the flat portion 17b of the negative lower gasket 17 at a position adjacent to the engagement recess 11a. A through hole 12e penetrating in a thickness direction is formed in the fixed portion 12c. The fixed portion 12c and the mount 12d, which are stepwise different in the height direction, are connected via a vertical wall 12f. The legs 12p and 12b extend downward from the mount 12d. The legs 12b and 12b are electrically connected to and mechanically coupled to the negative electrode in the electrode assembly 3 via a clip 10 schematically shown only in FIG. 1.

The shaft 22b of the rivet 22 in the negative external terminal 14 is inserted into the cylindrical portion 16d of the upper gasket 16, the through hole 17g formed in the caulked portion 17c of the negative lower gasket 17, and the through hole 12e formed in the fixed portion 12c of the negative current collector 12, and then, the tip is widened under pressure, thereby forming a large-diameter portion 22c. Consequently, the negative external terminal 14, the upper gasket 16, the caulked portion 17c of the negative lower gasket 17, and the base 12a of the negative current collector 12 are securely caulked and joined to the cover 4. Moreover, owing to the caulking and joining, the negative current collector 12 is electrically connected to the negative external terminal 14.

Referring to FIGS. 1 to 3, the positive external terminal 15 and the positive current collector 13 are fixed to the engagement receiving portion 11 on the right side via the upper gasket 16 and a positive lower gasket 18 which are made of an insulating resin, respectively.

In the same manner as the side of the negative electrode, the upper gasket 16 is attached to the engagement receiving portion 11. Moreover, the positive lower gasket 18 is formed into a plate having a through hole 18a, and is disposed inside of the engagement recess 11a.

The aluminum positive external terminal 15 includes a plate-like member 15a formed into a rectangular shape, as viewed on plane, and a cylindrical shaft 15b projecting from the center of the lower surface of the member 15a. The plate-like member 15a is contained in a terminal holding recess 16b of the upper gasket 16.

The aluminum positive current collector 13 includes a base 13a and a pair of legs (connectors) 13b and 13b. The base 13a includes a fixed portion 13c, which is contained inside of the engagement recess 11a and is fitted to the lower side of the positive lower gasket 18, and a mount 13d to be fitted to the lower surface 4a of the cover 4 at a position adjacent to the engagement recess 11a. A through hole 13e penetrating in a thickness direction is formed in the fixed portion 13c. The fixed portion 13c and the mount 13d which are stepwise disposed are connected via a vertical wall 13f. The legs 12b and 12b are electrically connected to and mechanically coupled to the electrode assembly 3 via a clip 10 schematically shown only in FIG. 1.

The shaft 15b of the positive external terminal 15 is inserted into the cylindrical portion 16d of the upper gasket 16, the through hole 18a formed in the positive lower gasket 18, and the through hole 13e formed in the fixed portion 13c in the positive current collector 13, and then, the tip is widened under pressure, thereby forming a large-diameter portion 15c. Consequently, the positive external terminal 15, the upper gasket 16, the positive lower gasket 18, and the base 13a of the positive current collector 13 are securely caulked and joined to the cover 4. Moreover, owing to the caulking and joining, the positive current collector 13 is electrically connected to the positive external terminal 15.

The battery 1 in the present embodiment is particularly featured by the following points.

First, referring to FIGS. 3 and 5 to 9, the rib 17h is disposed at the outer peripheral edge of the flat portion 17b in the negative lower gasket 17 interposed between the lower surface 4a of the cover 4 and the negative current collector 12. The height H of the rib 17h (see FIGS. 5 and 9) is more than the thickness of the base 12a of the negative current collector 12. The rib 17h sufficiently ensures an insulation distance defined between the negative current collector 12 and the cover 4, thus securely insulating the negative current collector 12 from the cover 4.

In particular, at the flat portion 17b of the negative lower gasket 17, the rib 17h having the thickness more than that of the base 12a is disposed at a portion corresponding to a position at which the legs 12b an 12b project from the mount 12d at a portion at which the electrode assembly 3 is electrically connected to the negative current collector 12, and therefore, the negative lower gasket 17 can effectively insulate the negative current collector 12c from the cover 4. At the base 12a of the negative current collector 12, the position, in particular, at which the legs 12b and 12b project from the mount 12d, need be securely insulated from the cover 4. Consequently, even if the rib 17h is not disposed over substantially the entire outer peripheral edge of the flat portion 17b of the negative lower gasket 17, unlike the present embodiment, but only at the portion corresponding to the position at which the legs 12b and 12b project from the mount 12d of the negative current collector 12 on the outer periphery of the flat portion 17b, the negative lower gasket 17 can effectively insulate the negative current collector 12c from the cover 4.

Next, the expanded portion 17a of the negative lower gasket 17 interposed between the negative current collector 12 and the cover 4 is contained in the engagement recess 11a formed at the lower surface 4a of the cover 4. Consequently, only the flat portion 17b formed into a thin plate in the negative lower gasket 17 projects from the lower surface 4a of the cover 4, thereby suppressing the projection of the negative lower gasket 17 from the lower surface 4a of the cover 4 to the minimum. In contrast, the entire positive lower gasket 18 is contained in the engagement recess 11a formed at the lower surface 4a of the cover 4. In this manner, the projection of each of the negative lower gasket 17 and the entire positive lower gasket 18 from the lower surface 4a of the cover 4 is suppressed to the minimum, and consequently, the upper end of the electrode assembly 3 can be disposed sufficiently near the lower surface 4a of the cover 4. Thus, it is possible to increase the occupancy of the electrode assembly 3 with respect to the volume of the battery cell 2, so as to enhance energy density.

Moreover, the wall surface constituting the engagement recess 11a at the lower surface 4a of the cover 4 is formed into a recess. The recessed wall surface defines or restrains the position of the expanded portion 17a of the negative lower gasket 17 contained in the engagement recess 11a. Specifically, the engagement recess 11a formed at the cover 4 and the expanded portion 17a of the negative lower gasket 17 are brought into contact with each other not on the plane but in mutual engagement. As a consequence, the negative lower gasket 17 can be prevented from being rotated with respect to the cover 4. In the present embodiment, the negative external terminal 14, the upper gasket 16, the caulked portion 17c of the negative lower gasket 17, and the base 12a of the negative current collector 12 are caulked and joined with respect to the cover 4 via the rivet 22. The expanded portion 17a of the negative lower gasket 17 is contained in the engagement recess 11a, so that the rivet 22 can prevent the rotation of the negative lower gasket 17 with respect to the caulked and joined portions. As described above, the rivet 22 is concerned in electrically connecting the negative current collector 12 and the negative external terminal 14, and therefore, the rotation of the negative lower gasket 17 at the caulked and joined portions via the rivet 22 is undesirable in view of the sureness of the favorable electric connection between the negative current collector 12 and the negative external terminal 14. The prevention of the rotation of the negative lower gasket 17 with the simple configuration in which the expanded portion 17a of the negative lower gasket 17 is contained in the engagement recess 11a of the cover 4 has a great advantage from the viewpoint of the favorable sureness of the electric connection between the negative current collector 12 and the negative external terminal 14.

Figure 7:
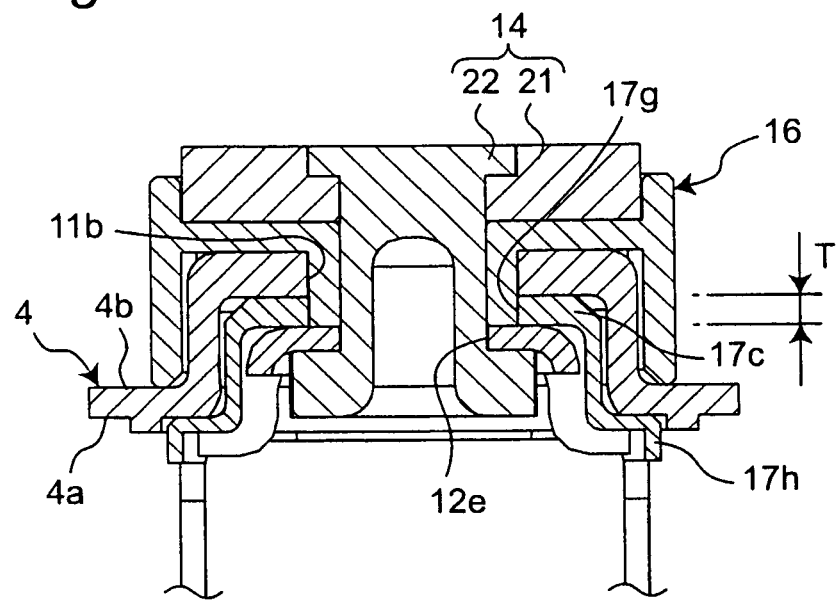
FIG. 7 is a cross-sectional view taken along a line VII-VII of FIG. 2.
Figure 8:
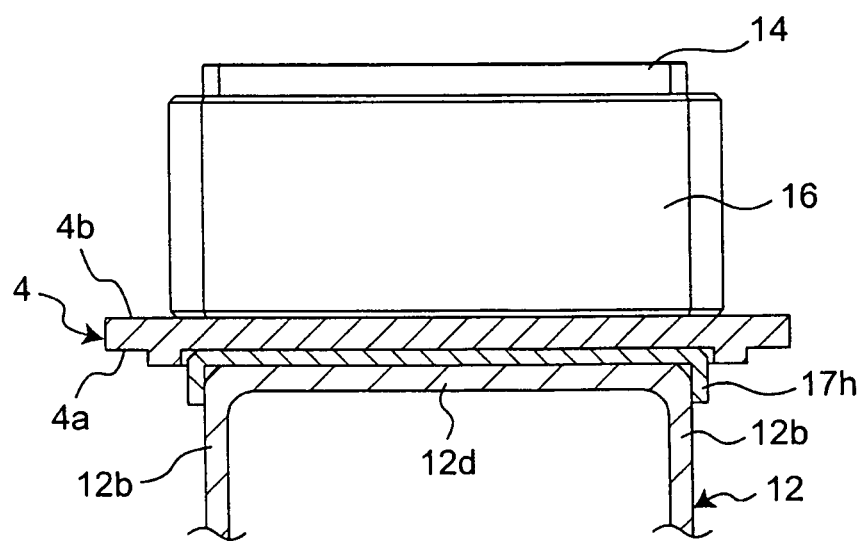
FIG. 8 is a cross-sectional view taken along a line VIII-VIII of FIG. 2.

In addition, as shown in FIGS. 3, 6, and 7, the thickness T of the caulked portion 17c caulked and connected to the cover 4 in the negative lower gasket 17 is set to be more than those of other portions in the negative lower gasket 17. In this manner, only the thickness T of the caulked portion 17c where a large force exerts by caulking is set to be large, so that the negative lower gasket 17 is reduced in weight and a material required for fabricating the negative lower gasket 17 is reduced while air tightness of the negative lower gasket 17 can be enhanced.

Additionally, referring to FIGS. 3 and 6, a clearance 31 is defined by the wall surface (i.e., the engagement receiving portion 11) surrounding the engagement recess 11a at the lower surface 4a of the cover 4 near a corner defined by the caulked portion 17c and the vertical wall 17d in the negative lower gasket 17. In particular, a clearance having a dimension indicated by reference numeral S1 is defined between side wall surfaces surrounding the vertical wall 17d of the negative lower gasket 17 and the engagement recess 11a. Moreover, a clearance having a greater dimension indicated by reference numeral S2 is defined between the tip of the caulked portion 17c of the negative lower gasket 17 and the side wall surface surrounding the engagement recess 11a at the lower surface 4a of the cover 4. In this manner, the clearances 31, S1, and S2 are defined between both ends of the caulked portion 17c of the negative lower gasket 17 and the wall surface (i.e., the engagement receiving portion 11) surrounding the engagement recess 11a, and therefore, room can be secured such that the caulked portion 17c is deformed (relieved) in a planar direction when the caulked portion 17c is compressed in a thickness direction during caulking and joining. Consequently, it is possible to securely prevent a damage such as a crack on the negative lower gasket 17 during caulking and joining.

The present invention is not limited to the embodiment, various modifications can be implemented. For example, although the present invention has been described by way of the configuration in which the expanded potion 17a of the negative lower gasket 17 is contained in the engagement recess 11a of the cover 4, a part of a gasket (i.e., a contained portion) may be contained in a recess formed at not the cover but the inner surface of a battery case.

What is claimed is:

1. A battery, comprising:
   a package containing an electrode assembly therein, the package including a plate comprising an inner surface part that is depressed to form a recess;
   a current collector which electrically connects an external terminal whose at least partly is disposed outside of the package to the electrode assembly;
   a gasket interposed between an inner surface of the package and the current collector,
      wherein the package comprises a case and a cover that seals the case; and
   an engagement receiving portion that expands upward from an upper surface of the cover around the external terminal,
   wherein the engagement receiving portion includes the recess formed in a depressed area of a lower surface of the cover, and
   wherein the gasket contains a portion of the engagement receiving portion which is contained in the recess, said portion of the engagement receiving portion being a contained portion such that corners of the contained portion fit in corners of the recess.

2. The battery according to claim 1, wherein the current collector includes a base which is electrically connected to the external terminal and a connector which projects from the base and is electrically connected to the electrode assembly, and
   wherein the contained portion of the gasket includes a caulked portion which is caulked and joined to the package together with the base, a thickness of the caulked portion being greater than a thickness of other portions of the gasket.

3. The battery according to claim 2, wherein a clearance is defined between surroundings of the contained portion of the gasket and a wall surface of the recess of the package.

4. The battery according to claim 2, wherein the gasket includes a rib which is disposed at least at a portion corresponding to a position at an outer peripheral edge of the body where the connector projects from the base of the current collector and has a height more than a thickness of the base of the current collector.

5. The battery according to claim 1, wherein the current collector includes a base which is electrically connected to the external terminal and a connector which projects from the base and is electrically connected to the electrode assembly, and
   wherein the base of the current collector includes a fixed portion contained inside of the recess of the package and fitted to a lower side of the contained portion of the gasket.

6. The battery according to claim 1, wherein the engagement receiving portion expands upward from an upper surface of the cover around the external terminal.

7. The battery according to claim 6, wherein the gasket comprises:
   an expanded portion contained inside of the recess; and
   a flat portion disposed in a region adjacent to the recess at the lower surface of the cover.

8. The battery according to claim 7, wherein the expanded portion of the gasket includes a caulked portion disposed with a step in a height direction with respect to the flat portion and extends in parallel to the flat portion.

9. The battery according to claim 7, wherein a wall surface of the recess restrains a position of the expanded portion of the gasket that is contained in the recess.

10. A battery, comprising:
    a package containing an electrode assembly therein, the package comprising a case and a cover that seals the case;
    a current collector which electrically connects an external terminal to the electrode assembly, the cover including an engagement receiving portion expanding upward from an upper surface of the cover around the external terminal, and the engagement receiving portion comprising a recess formed in a depressed area of a lower surface of the cover; and
    a gasket interposed in the recess between the lower surface of the package and the current collector,
    wherein the gasket contains a portion of the engagement receiving portion which is contained in the recess, said portion of the engagement receiving portion being a contained portion such that corners of the contained portion fit in corners of the recess.

11. The battery according to claim 10, wherein the gasket comprises:
    an expanded portion contained inside of the recess; and
    a flat portion disposed in a region adjacent to the recess at the lower surface of the cover.

12. The battery according to claim 11, wherein the expanded portion of the gasket includes a caulked portion disposed with a step in a height direction with respect to the flat portion and extends in parallel to the flat portion.

* * * * *